(12) United States Patent
Fernald

(10) Patent No.: US 9,658,975 B2
(45) Date of Patent: May 23, 2017

(54) DATA TRANSFER MANAGER

(75) Inventor: Kenneth W. Fernald, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 814 days.

(21) Appl. No.: 13/563,683

(22) Filed: Jul. 31, 2012

(65) Prior Publication Data

US 2014/0040512 A1 Feb. 6, 2014

(51) Int. Cl.
*G06F 3/00* (2006.01)
*G06F 13/28* (2006.01)

(52) U.S. Cl.
CPC .......... *G06F 13/28* (2013.01); *Y02B 60/1228* (2013.01)

(58) Field of Classification Search
CPC ...... G06F 13/00; G06F 12/1081; G06F 15/17; G06F 2009/45579
See application file for complete search history.

(56) References Cited

U.S. PATENT DOCUMENTS

| 4,371,932 A | 2/1983 | Dinwiddie, Jr. et al. |
| 4,979,100 A | 12/1990 | Makris et al. |
| 7,469,307 B2 | 12/2008 | Hosoya et al. |
| 2004/0028053 A1* | 2/2004 | Mes ........................... 370/395.7 |
| 2004/0030816 A1* | 2/2004 | Knight et al. .................. 710/52 |
| 2004/0186930 A1* | 9/2004 | Gadkari et al. ................. 710/22 |
| 2005/0044283 A1* | 2/2005 | Muro ................................ 710/8 |
| 2006/0259662 A1* | 11/2006 | Furukawa et al. .............. 710/40 |
| 2009/0100296 A1* | 4/2009 | Srinivasan et al. ............. 714/43 |

* cited by examiner

*Primary Examiner* — Hyun Nam
(74) *Attorney, Agent, or Firm* — Meyertons, Hood, Kivlin, Kowert & Goetzel, P.C.

(57) ABSTRACT

Techniques are disclosed relating to a system that implements direct memory access (DMA). In one embodiment, an apparatus is disclosed that includes a dedicated data transfer management (DTM) circuit. The DTM circuit is configured to provide commands to a direct memory access (DMA) controller coupled to a bus to facilitate the DMA controller retrieving portions of a data object to be transmitted to a peripheral circuit via the bus. In some embodiments, the DTM is configured to assemble a data packet having a payload supplied by a processor, where the DTM circuit is configured to assemble the data packet by generating direct memory access (DMA) requests for the DMA controller. In such an embodiment, the DMA requests cause a plurality of peripheral circuits coupled to the bus to transfer portions of the data packet over the bus.

20 Claims, 10 Drawing Sheets

DATA TRANSFER MANAGER

BACKGROUND

Technical Field

This disclosure relates generally to integrated circuits, and, more specifically, to integrated circuits implementing direct memory access (DMA).

Description of the Related Art

An integrated circuit may implement a DMA system to facilitate performance of read and write operations between peripheral devices on a system bus without involving the processor to facilitate the exchange. In such a system, peripheral devices wishing to send or receive data may submit requests to a DMA controller, which, in turn, generates a set of corresponding bus master commands to set up the exchanges. For example, an input/output (I/O) device that wishes to store new data (e.g., from a user's input) in memory may submit a request to the DMA controller to perform the exchange (as opposed to having the central processing unit (CPU) read the data and write it to memory).

DMA controllers may also be used to move data from one location in memory to another without involving the processor for each read and write operation. For example, a processor's memory controller unit may instead specify, to a DMA controller, a source address of where the data is located, a destination address to store the data, and a block size identifying the size of the data. The DMA controller may then generate the writes and reads to move the data while the processor is able to perform other various operations.

SUMMARY

The present disclosure describes embodiments of structures and methods relating to DMA.

In one embodiment, an apparatus is disclosed that includes a direct memory access (DMA) controller coupled to a bus and a data transfer management (DTM) circuit. The apparatus further includes a processor configured to execute program instructions to configure the DTM circuit to provide DMA requests to the DMA controller to facilitate the DMA controller retrieving a data object and transmitting the data object to a peripheral circuit via the bus.

In another embodiment, an apparatus is disclosed that includes a DTM circuit configurable by a processor to coordinate assembly of a data packet having a payload supplied by a processor. The DTM circuit is configured to coordinate assembly by generating DMA requests for a DMA controller. The DMA requests cause a plurality of peripheral circuits coupled to a bus to transfer portions of the data packet over the bus.

In yet another embodiment, a method is disclosed. The method includes receiving a first set of DMA requests from a plurality of peripheral circuits configured to generate portions of a data packet. The method further includes issuing a second set of DMA requests to a DMA controller, where the DMA controller causes the generated portions to be presented to a circuit. In such an embodiment, the second set of DMA requests are issued based on the first set of DMA requests.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

The present disclosure describes embodiments of a system that includes one or more DMA controllers to implement direct memory access among a plurality of peripheral devices on a bus. In various embodiments, the system includes one or more DTM circuits configured to provide requests to a DMA controller to facilitate the DMA controller retrieving portions of a data object. The DTM circuit may collect DMA request signals from various peripherals and generate a series of corresponding master DMA requests based on a state-driven configuration. These master requests may drive a set of DMA channels to perform functions such as assembling and transferring of portions of the data object. In some embodiments, a processor (e.g., central processor unit, microcontroller unit (MCU), etc.) is able to operate in a reduced-power mode (e.g., a mode in which the master clock signal is disabled) or perform other operations while the DTM circuit initiates transfer operations. In some embodiments, DTM circuits may be used by systems that are power conscious such as those dependent on battery power supplies.

In some embodiments, the data object is a data packet for a radio circuit. In such an embodiment, a DTM circuit may be configured to coordinate transactions of various data packet portions among various ones of the peripheral circuits to facilitate the assembly of the data packet. In other embodiments, however, the data object may be an object other than a data packet. Thus, while various techniques and structures described below may be described, in some embodiments, within the context of packet assembly, in other embodiments, such techniques and structures may be used for suitable applications other than packet assembly or even radio transmissions. For example, in one embodiment, the data object may correspond to data being assembled for output via a display. In such an embodiment, DTM circuit may coordinate transactions among peripheral circuits configured to perform various rendering operations. In sum, the data object may be any suitable collection of information transmitted over a bus.

Figure 1:
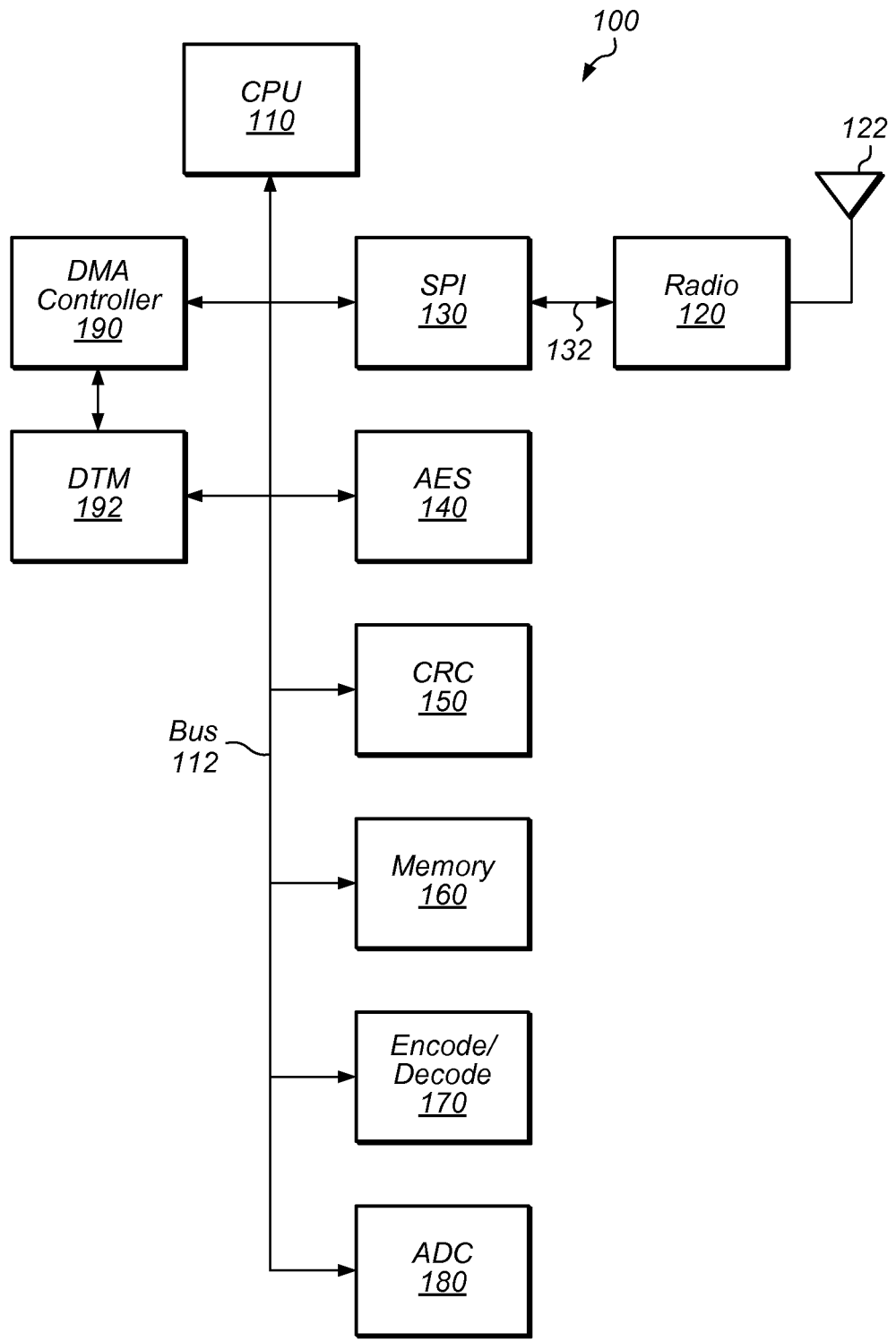
FIG. 1 is a block diagram illustrating one embodiment of a system that implements DMA.

Turning now to FIG. 1, a block diagram of a system 100 that implements DMA is depicted. In the illustrated embodiment, system 100 includes a central processor unit (CPU) 110, radio circuit 120, and multiple peripheral circuits 130-180 coupled together via a bus 112. System 100 further includes a DMA controller 190 of bus 112 and a data transfer manager (DTM) 192. In some embodiments, system 100 may include a different set of circuits 110-192 than shown. For example, in one embodiment, system 100 may include multiple DTMs 192. In some embodiments, system 100 may be implemented as a system on a chip (SoC). In other embodiments, circuits 110-192 may be located on multiple separate integrated circuits—accordingly, in one embodiment, radio circuit 120 may be located on a separate integrated circuit than circuits 110 and 130-192.

CPU 110, in one embodiment, is configured to execute instructions (software and/or firmware) to facilitate operation of system 100. In various embodiments, CPU 110 may produce or consume data that is operated on by various ones of peripherals 130-180. In the illustrated embodiment, this data may include data that is transmitted or received via radio 120 (e.g., as payload in a data packet). As will be described below, this data may be transferred among peripherals 130-180 via DMA transactions initiated by DTM 192. In various embodiments, CPU 110 executes program instructions to configure DTM 192 to provide DMA requests to DMA controller 190 to facilitate the DMA controller 190 retrieving a data object and transmitting the data object to peripherals 130-180 via bus 112.

CPU 110 may be any suitable type of processor. CPU 110 may be a superscalar processor with a single or multiple pipelines, a microprocessor, a microcontroller, etc. CPU 110 may include a single or multiple cores each configured to execute instructions. CPU 110 may support any suitable instruction set architecture (ISA). For example, in one embodiment, CPU 110 is configured to support an Advanced RISC Machines (ARM) ISA. Although circuit 110 is shown as a CPU in the illustrated embodiment, in other embodiments, circuit 110 may be an MCU, an arithmetic processing unit, a graphics processing unit (GPU), a digital signal processor (DSP), etc. In some embodiments, circuit 110 may also be an application-specific integrated circuit (ASIC), a field-programmable gate array (FPGA), etc.

In some embodiments, CPU 110 is configured to operate in a reduced power mode depending on processor demand. When operating in such a mode, CPU 110 may reduce its clock frequency, lower supply voltages, halt execution, stop its clock from oscillating, offload cache contents, disable various internal circuitry, etc. In some embodiments, CPU 110 may be configured to support one or more states defined by the Advanced Configuration and Power Interface (ACPI) standard such as ACPI performance states ("P-States") and/or power states ("C-states").

Radio 120, in one embodiment, is configured to transmit and receive data via an antenna 122. Radio 120 may perform various operations such as modulation/demodulation, amplification, filtering, digital-to-analog conversion, analog-to-digital conversion, etc. In some embodiments, radio 120 is configured to support a defined standard such as IEEE 802 standards (e.g., WIFI, BLUETOOTH, ZIGBEE, WMAX, etc.), cellular standards (e.g., GSM, CDMA, etc.), meter device standards (e.g., M-BUS), etc. (In other embodiments, circuit 120 may not be a radio circuit, but rather, a circuit for communicating via a wired interface.) In various embodiments, radio 120 is configured to communicate information in the form of data packets. As will be described below, various portions of the data packets may be generated by peripherals 140-180 such as headers, encrypted blocks, checksums, trailers, etc.

Serial peripheral interface (SPI) 130, in one embodiment, is configured to send assembled packets via bus 132 to radio 120 and receive packets for disassembly from radio 120. Although circuit 130 is depicted as supporting SPI in the illustrated embodiment, in other embodiments, circuit 130 may be configured to support other physical layer protocols. In the illustrated embodiment, SPI 130 receives portions of outbound packets and sends portions of inbound packets via bus 112.

Bus 112, in one embodiment, is configured to exchange information between various ones of circuits 110-180. Transactions over bus 112 may be initiated by one or more circuits configured to operate as a bus master circuit (such as CPU 110 and DMA controller 190, in one embodiment) driving the appropriate control lines on bus 112. Bus 112 may implement any suitable bus architecture. For example, in some embodiments, bus 112 corresponds to an Advanced High-performance Bus (AHB) or an Advanced Peripheral Bus (APB). While depicted as a single bus, bus 112 may also correspond to multiple buses, in some embodiments—e.g., an AHB coupled to an APB via a bridge circuit.

AES 140, in one embodiment, is configured to encrypt and decrypt packet data according to the Advanced Encryption Standard (AES). However, in other embodiments, circuit 140 may implement any suitable encryption algorithm. Accordingly, in some embodiments, circuit 140 may be configured to implement the Data Encryption Standard (DES), Rivest Shamir Adleman (RSA), Digital Signature Algorithm (DSA), SNOW cipher, etc.

Cyclic redundancy check (CRC) 150 is configured to produce CRC values for packet data. Examples of CRC algorithms that may be supported by CRC 150 include CRC32 (which uses the polynomial 0x04C11DB7 and may be employed by IEEE 802.3), CRC16a (which uses the polynomial 0x1021 and may be employed CCITT-16), CRC16b (which uses the polynomial 0x3D65 and may be employed by IEC16—M-Bus), CRC16c (which uses the polynomial 0x8005 and may be employed by ZigBee, IEEE 802.15.4, USB), etc. Circuit 150 may be configured to support any other suitable algorithms, however. Accordingly, in other embodiments, circuit 150 may be configured to produce a checksum value such as Hamming codes, Reed-Muller codes, etc. In some embodiments, circuit 150 may be configured to perform a hashing operation such as those performed in MD1-MD6, SHA0-SHA3, etc.

Memory 160, in one embodiment, is configured to store data accessible by ones of circuits 110-192 (such as portions of packet data, in some embodiments). Accordingly, memory 160 may store instructions of software/firmware executable by CPU 110. Memory 160 may be any suitable type of memory, such as flash memory, random access memory (RAM—static RAM (SRAM), extended data out (EDO) RAM, synchronous dynamic RAM (SDRAM), double data rate (DDR) SDRAM, RAMBUS RAM, etc.), read-only memory (ROM—programmable ROM (PROM), electrically erasable programmable ROM (EEPROM), etc.), and so on.

Encode/Decode 170, in one embodiment, is configured to encode and decode data according to an encoding algorithm. In some embodiments, encode/decode 170 is configured to implement a Manchester Encoder in which a sequence of bits is encoded as a set of transitions. For example, a logical one may be encoded as a rising transition from a logical zero to a logical one; a logical zero may be encoded as a falling transition from a logical one to a logical zero.

Analog-to-digital converter (ADC) 180, in one embodiment, is configured to sample an analog signal and produce a corresponding digital value. In some embodiments, payload data may include data captured by ADC 180. ADC 180 may implement any suitable ADC scheme such as a sigma-delta ADC, time-interleaved ADC, etc.

DMA controller 190, in one embodiment, is configured to facilitate transactions over bus 112. DMA transactions may include transferring data between CPU 110 and memory 160, between one location in memory 160 to another location in memory 160, or between a peripheral 130-180 and memory 160. In some embodiments, DMA controller 190 may also be configured to perform a peripheral-to-peripheral DMA transaction in which data is transferred from one peripheral to another without temporarily storing the data in memory 160. In various embodiments, DMA controller 190 supports multiple DMA channels that are each configurable to coordinate a transaction from a respective source to a respective destination. In some embodiments, CPU 110 may provide channel configuration information for each DMA channel such as specifying an address for the source, an address of the destination, block sizes, etc. In one embodiment, DMA controller 190 is configured to implement a peripheral-scatter-gather (PSG) configuration in which controller 190 loads channel configuration information previously stored in memory 160—this information may be chained together in a linked list structure. In some embodiments, DMA controller 190 may be one of several DMA controllers in system 100. DMA controller 190 is discussed in further detail below with respect to FIG. 2.

DTM 192, in one embodiment, is configured to generate a series of master DMA requests for controller 190 to move various portions of data over bus 112. In various embodiments, DTM 192 collects DMA request signals from various peripherals 130-180 and generates a corresponding set of master DMA requests based on a state-driven configuration. In some embodiments, these master requests drive a set of DMA channels to perform functions such as assembling and disassembly of communication packets for radio 120. For example, DTM 192 may generate a series of master DMA requests that cause controller 190 to transfer a payload from memory 160 to AES 140 for encryption, transfer the encrypted payload to encoder 170 for encoding, and then transfer the encoded data to SPI 130 for inclusion in an assembled packet provided to radio 120. Although a single DTM 192 is shown in the illustrated embodiment, DTM 192 may be one of a plurality of DTM circuits, in other embodiments, where each DTM 192 is responsible for assembling a respective portion of a data packet.

In various embodiments, DTM 192 is configured to execute complex data transfers without intervention from CPU 110. That is, CPU 110 may initialize DTM 192 by providing a set of configuration information to DTM 192, and CPU 110 may then proceed to perform other operations independently of DTM 192. In some embodiments, CPU 110 may be configured to enter a reduced power mode (such as discussed above) while DTM 192 is executing operations. This capability may allow system 100 to operate more efficiently and/or reduce total power consumption.

Figure 2:
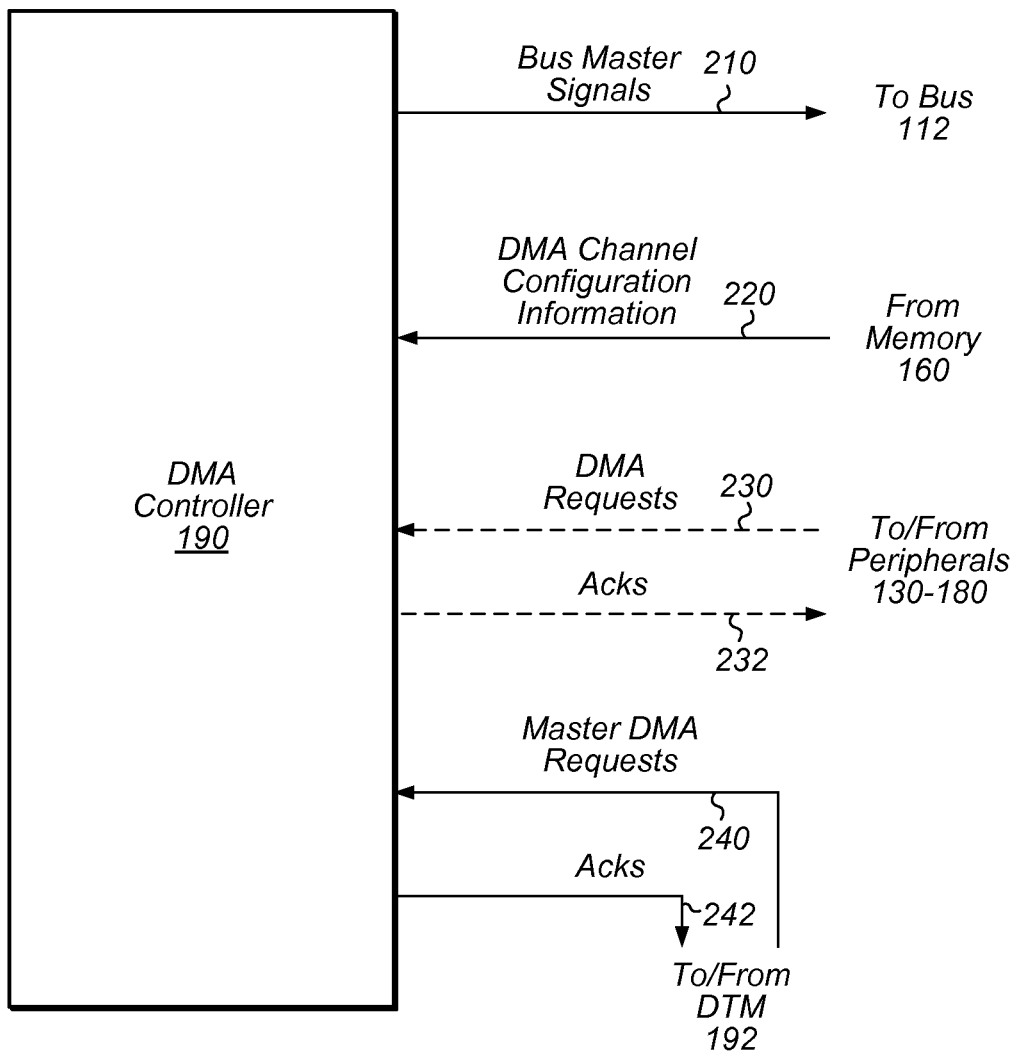
FIG. 2 is a block diagram illustrating one embodiment of a DMA controller included in the system.

Turning now to FIG. 2, a block diagram of DMA controller 190 is depicted. In the illustrated embodiment, DMA controller 190 is configured to issue bus master signals 210 in response received DMA requests 230 and 240. In the illustrated embodiment, DMA controller 190 is also configured to implement a peripheral-scatter-gather configuration in which it loads DMA channel configuration information 220 from memory 160. In other embodiments, DMA controller 190 may be configured differently than shown.

Bus master signals 210, in one embodiment, are issued to initiate a transaction over a bus 112. Signals 210 may include an acquisition signal for acquiring control of bus 112 such as from CPU 110. Signals 210 may include address signals specifying a source address and a destination address for a transaction; in one embodiment, these addresses may refer to locations in memory 160 or refer to locations associated with peripherals 130-180 (e.g., internal registers within those circuits). Signals 210 may include a write/read signal indicating a direction for traffic during a transaction.

DMA channel configuration information 220, in one embodiment, includes various configuration information specific to each DMA channel. Information 220 may include a source address, a destination address, a block size, an indication of whether an operation is to be a write operation or a read operation, etc. For example, information 220 may specify that a request to DMA channel 0 will cause a word of data to be written to a specific address in memory 160 from CRC 150. As noted above, in one embodiment, CPU 110 may write this information to memory 160. In some embodiments, DMA controller 190 may be configured to continually load information 220 as transactions are being performed. That is, after performing a transaction for a given channel (e.g., DMA channel 0), controller 190 may proceed to load configuration information 220 from memory 160 for the next transaction via that channel.

In the illustrated embodiment, DMA Requests 230 are requests issued directly from peripherals 130-180 (as opposed to being routed to DTM 192). As will be described below, in some embodiments, DTM 192 may support being enabled or disabled according to a configuration setting. In one embodiment, if DTM 192 is enabled, some portion of DMA requests 230 may be routed to DTM 192 rather than being provided to DMA controller 190 as requests 230— thus, DMA requests 230 (as well as Acks 232) are indicated with a dotted line in the illustrated embodiment. In various embodiments, DMA controller 190 is configured to issue a corresponding acknowledgment (Ack) 232 for each request 230 when it is servicing (or finished servicing) that request 230. This signal 232 may be used by the peripheral to coordinate the timing for sending (or receiving) data over bus 112. In some embodiments, a given Ack 232 (as well as an Ack 242) may include multiple signals such as an active signal (sent while a request 230 is being serviced) and a done signal (sent on completion of the request).

In the illustrated embodiment, master DMA requests 240 are requests issued by DTM 192 to coordinate moving various portions of data to or from peripherals 130-180. In various embodiments, master DMA requests 240 may be addressed to any one of various DMA channels. Accordingly, in some embodiments, DTM 192 is configured to address requests 240 to every DMA channel supported by controller 190; in other embodiments, requests 240 may be addressed to only a subset (e.g., 4 DMA channels out of 12 possible DMA channels supported by controller 190, in one embodiment). In one embodiment, using multiple DMA channels may be more efficient—particularly when DTM 192 returns to the same state repeatedly. Using multiple DMA channels may also allow basic DMA operations to replace a long sequence of PSG tasks in most applications such as packet assembly. In some embodiments, DMA controller 190 is configured to receive DMA requests 240 from multiple DTMs 192 (e.g., three DTMs 192, in one embodiment).

Figure 3:
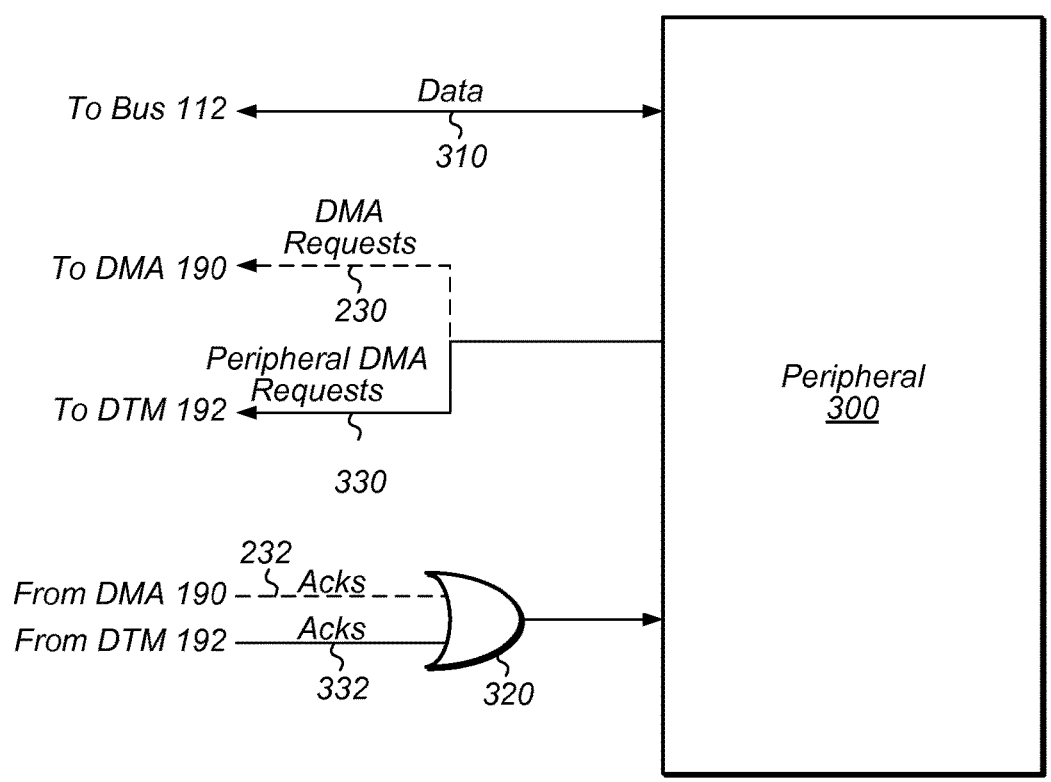
FIG. 3 is a block diagram illustrating one embodiment of a peripheral included in the system.

Turning now to FIG. 3, a block diagram of a peripheral 300 is depicted. Peripheral 300 is one embodiment of a circuit that may correspond to one or more peripherals 130-180. As discussed above, in some embodiments, peripherals 130-180 may produce data that is transmitted over bus 112 via DMA.

In the illustrated embodiment, peripheral 300 indicates when it is ready to send or receive data 310 by asserting either a DMA request 230 or a peripheral request 330. As discussed above, in one embodiment, one or more DMA requests may be routed to DTM 192 when DTM 192 is enabled (as opposed to being sent to DMA controller 190). In the illustrated embodiment, DMA requests 230 are sent if DTM 192 is not enabled; DMA requests 330 are sent to DTM 192 if DTM 192 is enabled. Similar to requests 230 and 330, peripheral 300 may also receive either acknowledgment signals 232 or acknowledgement signals 332 depending on whether DTM 192 is enabled. In the illustrated embodiment, signals 232 and 332 pass through a logical OR gate 320 before being provided to peripheral 300.

Figure 4:
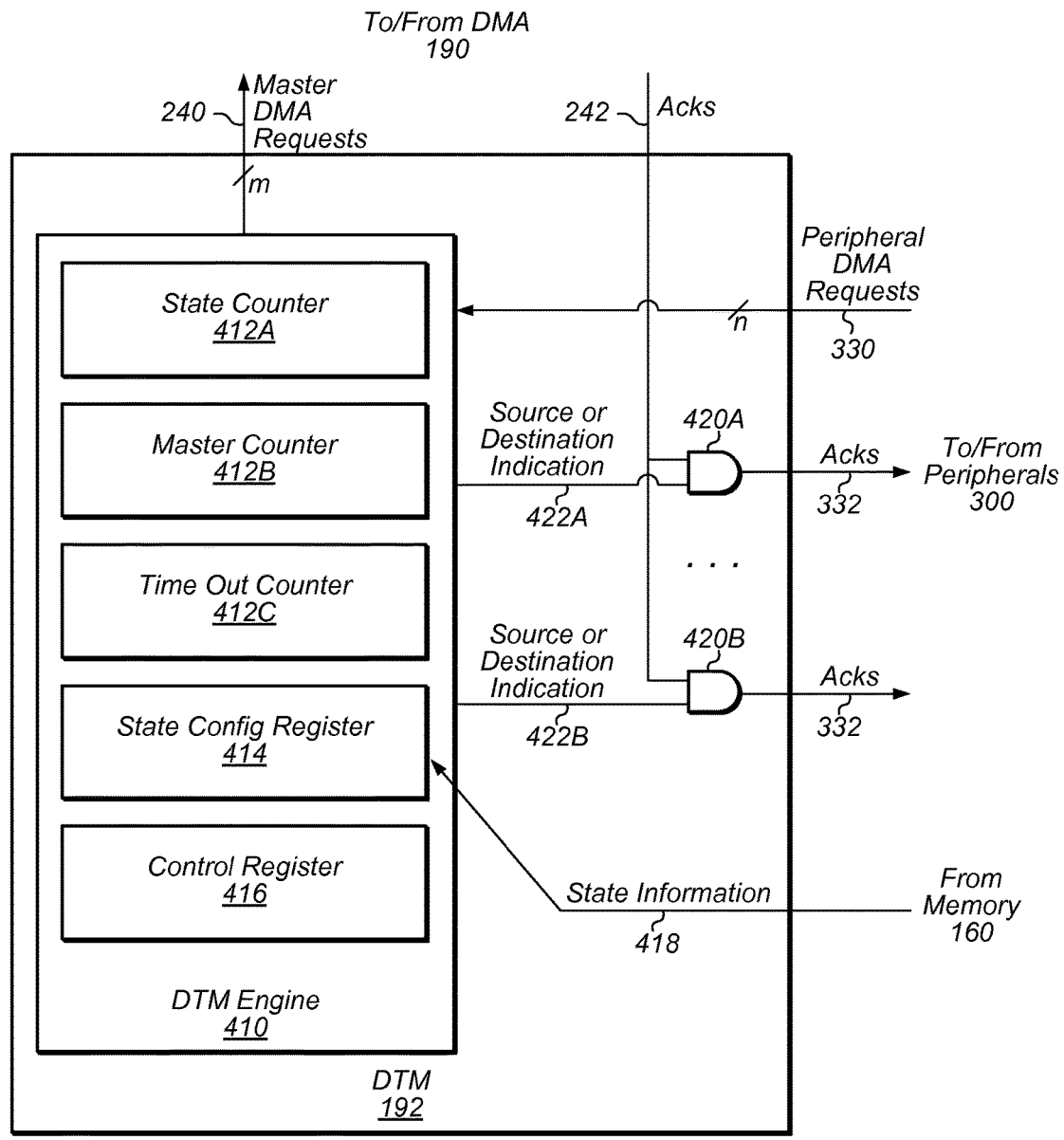
FIG. 4 is a block diagram illustrating one embodiment of a data transfer manager included in the system.

Turning now to FIG. 4, a block diagram of DTM 192 is depicted. In the illustrated embodiment, DTM 192 includes a DTM engine 410, which, in turn, includes a set of counters 412, a state configuration register 414, and a control register 416. DTM 192 further includes a set of AND gates 420.

DTM Engine 410, in one embodiment, is configured to issue a set of master DMA requests 240 to coordinate a set of DMA transactions on behalf of received peripheral requests 330. In various embodiments, engine 410 includes state logic implementing a state machine to determine when to issue requests 240. In one embodiment, each state asserts a configured number of DMA requests 240 to a selected one or more DMA channels contingent on receiving requests 330 from specific source and destination peripherals 130-180. In general, each DMA request 240 serves to initiate transfer of data from a source peripheral to a destination peripheral in system 100. In one embodiment, when a given state is active, DTM engine 410 waits until both specified source and destination peripherals have asserted their DMA request signals 330, indicating that both are ready to transmit or receive DMA traffic, respectively. At this time, DTM engine 240 asserts a master DMA request signal 240 for a selected DMA channel, causing DMA controller 190 to perform the next task in that channel's sequence of operation. This DMA task satisfies the source and destination peripheral requests by moving data from the source peripheral to the destination peripheral. In various embodiments, the state machine is configurable to various applications. For example, in one embodiment, the state machine is configured for assembling and disassembling data packets such as discussed above. Accordingly, as DTM engine 410 walks through the set of configurable states, engine 410 issues requests 240 to coordinate assembly/disassembly of data packets. One embodiment of a portion of the state machine implemented by engine 410 is discussed below with respect to FIG. 5.

In some embodiments, DTM engine 410 is also configured to send corresponding acknowledgment signals 332 to requesting peripherals 130-180, by routing (i.e., steering) received acknowledgment signal 242 from DMA controller 190 to those peripherals 130-180. (As discussed above, Ack signals 332 may be used by peripherals 130-180 to coordinate driving data on bus 112 or capturing data from bus 112, or to terminate a sequence of bus operations.) In the illustrated embodiment, DTM 410 coordinates the routing by asserting a signal 422 for both the source and the destination. These signals 422 then cause the appropriate AND gates 422 to assert an Ack signal 242 as Ack signals 332. In one embodiment, routing Ack signals 242 in this manner allows peripheral-to-peripheral DMA transactions to be performed as DMA controller 190 may be configured to output only a single acknowledgement signal (e.g., signal 232) in response to a given DMA request (e.g., a request 230). In some embodiments, DTM engine 410 may determine which signals 422 to assert based on the implemented state machine.

To facilitate implementation of the state machine, DTM engine 410 may maintain counters 412A-412C. In one embodiment, the values of these counters may be used to determine when state transitions are to be performed.

State counter 412A, in one embodiment, tracks the number of requests 240 generated since a given state has become active. Accordingly, state counter 412A may be initialized to a configured value for the active state and decremented (or incremented, in another embodiment) each time a DMA request 240 is generated. In one embodiment, DTM engine 410 transitions to another state (i.e., the next active state) in response to counter 412A reaching a particular threshold. In some embodiments, counter 412A may be initialized to a value indicative of a given block size. For example, if a packet payload is being moved from memory 160 to AES 140 for encryption during a given state, counter 412A may be initialized to a value that corresponds to the number of DMA transactions appropriate to move the payload.

Master counter 412B, in one embodiment, tracks the total number of requests 240 generated since DTM 192 is enabled. Accordingly, counter 412B may be initialized by firmware and decremented (or incremented) to track each DMA request 240 generated since it was last initialized. In some embodiments, the decrement operation for counter 412B can be enabled on a state-by-state basis, allowing only certain DMA requests 240 to cause a decrement. In one embodiment, this allows, for example, counter 412B to track the number of payload bytes transferred to a peripheral, but not header or CRC bytes. In various embodiments, DTM engine 410 may transition to final completion state 540 upon counter 412B reaching a particular value. In one embodiment, DTM engine 410 may signal CPU 110 via an interrupt upon reaching such a state.

Time out counter 412C, in one embodiment, tracks an amount of time (e.g., number of clock cycles) that a state is active. If this amount reaches a threshold indicative that an error may have occurred, DTM engine 410 may transition to an error state and declare a timeout error, which may include, in one embodiment, causing an interrupt of CPU 110 and raising an error flag. Accordingly, upon becoming active, each state may selectively reload counter 412C and decrement (or increment) on each clock cycle while the state is active.

State configuration register 414, in one embodiment, stores the configuration information 418 for the currently active state. This information may specify the source and destination peripherals 130-180 for a set of transactions, the number of transactions to be performed, the DMA channel to be specified in one or more requests 240, values that counters 412 are to be initialized to, etc. In various embodiments, DTM engine 410 reloads the contents of register 414 with a new state's configuration information when that state becomes active. In some embodiments, DTM 192 is configured to operate as a bus master to load this information 418 from, for example, a system memory. Alternatively, DTM 192 may include a local bank of registers which hold state information 418. In one embodiment, DTM 192 identifies this information 418 by maintaining a table head address register (not shown) that includes a base address for the information 418. The contents of register 414 are discussed in further detail below with respect to FIG. 6

Control register 416, in one embodiment, stores general status and configuration information for DTM 192. This information may include an enable/disable bit, an interrupt flag, an indication of the currently active state, an indication of the previously active state, etc. In one embodiment, register 416 may be written or read by software/firmware executing on CPU 110. The contents of register 416 are discussed in further detail below with respect to FIG. 7.

Figure 5:
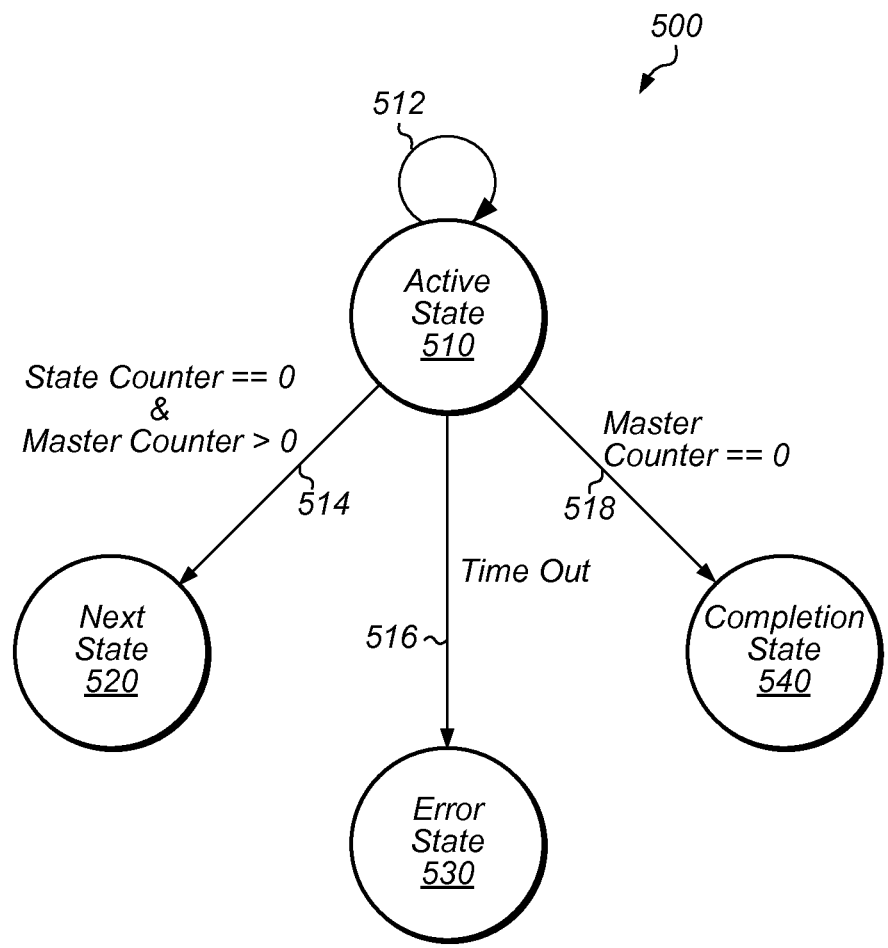
FIG. 5 is a diagram illustrating one embodiment of a state machine implemented by the data transfer manager.

Turning now to FIG. 5, a diagram of a state machine 500 is depicted. State machine 500 is one embodiment of a portion of the state machine implemented by DTM 192. In the illustrated embodiment, state machine 500 includes four types of states: an active state 510, a next state 520, an error state 530, and a completion state 540. Upon making a state transition, either the next state 520, the error state 530, or the completion state 540 will become the next active state 510.

In one embodiment, state machine 500 begins operation an initial active state 510 in response to DTM 192 becoming enabled. In general, each active state 510 causes DTM 192 to repeat a specific number of DMA operations from one peripheral 130 to another peripheral 180. For example, a given active state 510 may cause DTM 192 to issue a specific number of DMA requests 240 in order to move 16 bytes of data from memory 160 to CRC 150. In one embodiment, upon entering an active state, DTM 192 may begin by loading state configuration information 418 from memory 160 into register 414. DTM 192 may then initialize counters 412A, 412B, and/or 412C according values specified in registers 414 and 416. In some embodiments, some portion of state information 418 may be loaded directly into a circuit in DTM 192 (for example, state counter 412A) without first being stored in state config register 414.

In one embodiment, once the active state 510 is initialized, DTM 192 may wait until the source and destination peripherals specified in the state information 418 assert their respective DMA requests 330 indicating that they are available to send or receive data 310, respectively. (In some embodiments, memory 160 may not assert a DMA request 330 as it is always ready to send and receive data—thus, if memory 160 is specified as a source or destination, DTM 192 does not wait for a DMA request 330 from memory 160). Upon receiving a request 330 from both the source and the destination peripherals, DTM 192 may assert a master DMA request 240. This operation is represented as transition 512, in the illustrated embodiment (assuming a transition to another active state is not indicated). DTM 192 may repeat this process of waiting for requests 330 and asserting corresponding master requests 240 until transitioning to one of states 520-540.

In one embodiment, DTM 192 adjusts (e.g., decrements) the values of state counter 412A and master counter 412B in response to transitions 512. Meanwhile, DTM 192 may also be adjusting time counter 412C (which may be performed periodically based on a clock cycle, in one embodiment). As discussed above, in one embodiment, state counter 412A may be initialized to the number of transitions 512 to be performed in a given state 510, and may track the number of DMA requests that have been issued since the state 510 has become active. Master counter 412B may be initialized to the total number of DMA requests 240 to be issued to assemble a data object, and may tract the number of issued DMA requests 240 since DTM 192 has become enabled. Time out counter 412C may track the amount of time since the last DMA request 240 was issued.

In the illustrated embodiment, if state counter 412A reaches zero and master counter 412B still has a value greater than zero, state machine 500 performs a transition 514 to a next state 520. At this point, this state 520 becomes the current active state 510, and the process for a state 510 repeats again. Accordingly, state machine 500 may have several ones of states 520. For example, in one embodiment, DTM 192 is configured to support up to 15 states, each state having its own configuration defining how that state operates.

In the illustrated embodiment, if time out counter 412C reaches a predefined threshold before state machine can transition to state 520 or 540, state machine 500 performs a transition 516 to error state 530. Upon reaching state 530, in one embodiment, DTM 192 may raise an interrupt and sets a flag indicative that an error has occurred for CPU 110. CPU 110 may then execute software/firmware that attempts to recover from or resolve the problem that created the error.

In the illustrated embodiment, state machine 500 performs a transition 518 to completion state 540 in response to master counter 412B reaching zero. In various embodiments, reaching completion state 540 indicates that DTM 192 has finished issuing all requests 240 specified by state machine 500. For example, in one embodiment, reaching state 540 indicates that DTM 192 has issued all the DMA requests 240 appropriate to assemble a data packet for transmission by radio 120. Upon reaching state 540, DTM 192 may raise an interrupt to indicate completion and await further instructions from the CPU 110. Alternatively, a transition to completion state 540 may cause the DTM 192 to proceed to the next phase of a configured operation, such as causing trailing data to be appended to a radio packet.

Figure 6:
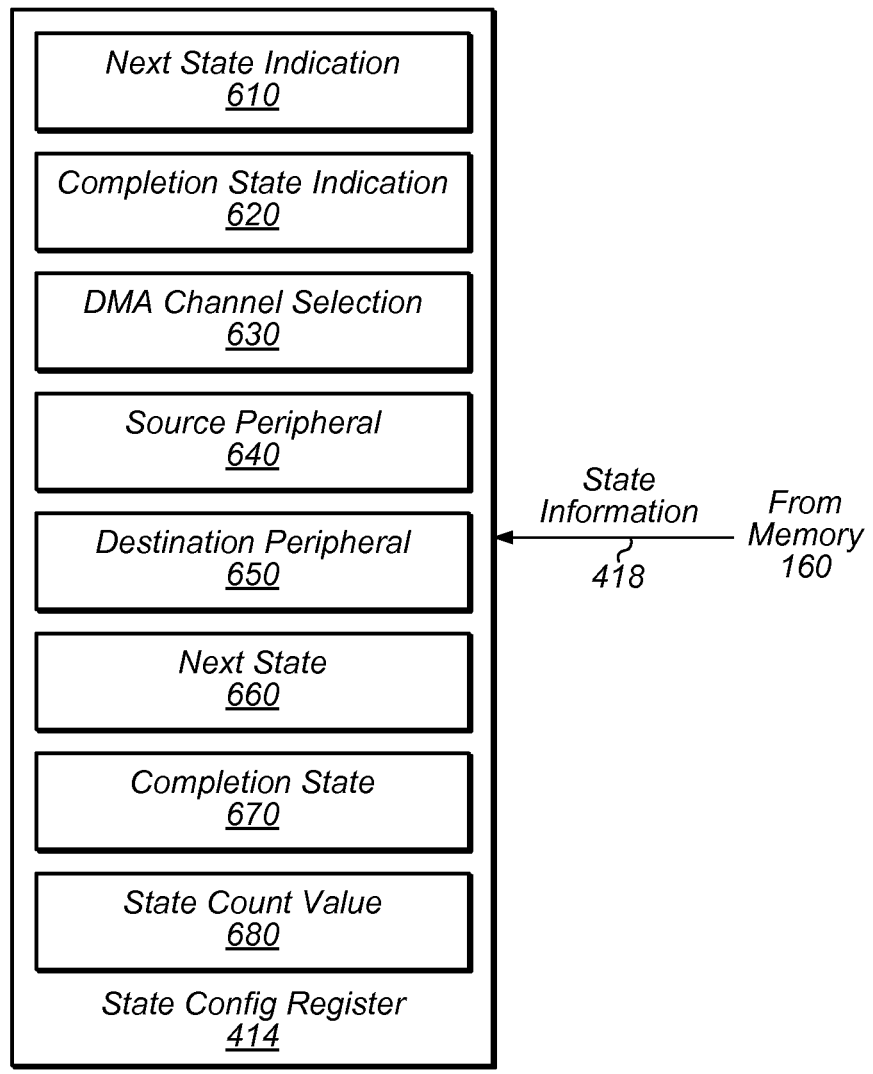
FIG. 6 is a block diagram illustrating one embodiment of a state configuration register of the data transfer manager.

Turning now to FIG. 6, a block diagram of a state configuration register 414 is depicted. As discussed above, in some embodiments, DTM 192 is configured to operate as a bus master to retrieve state configuration information 418 from a table of configuration information in memory 160. This state information 418 may be used by DTM 192 to implement a given state in a state machine (such as state machine 500). In the illustrated embodiment, bits of register 414 correspond to settings 610-680. In some embodiments, register 414 may store different settings 610-680 than shown.

Next state indication 610, in one embodiment, is a 1-bit value specifying whether DTM 192 is to raise an interrupt upon transitioning to a next state 520 from the active state 510. For example, if indication 610 has a value of one, DTM 192 may raise an interrupt on such a transition.

Completion state indication 620, in one embodiment, is a 1-bit value specifying whether DTM 192 is to raise an interrupt upon transition to a completion state 540 from the active state 510.

DMA channel selection 630, in one embodiment, is a value specifying a DMA channel to be used for master requests 240 issued during the active state 510. For example, selection 630 may specify that each request 240 be addressed to channel 0 during this active state 510.

Source peripheral 640, in one embodiment, is a value specifying the source peripheral (e.g., one of peripherals 130-180) for each DMA transaction performed during active state 510. In some embodiments, source peripheral 640 may be used to route an acknowledgement 242 to the correct source peripherals 130-180 via AND gates 420. Alternatively, a predefined value of source peripheral 640 may indicate that the source is always ready to read and/or write data, e.g. a RAM—thus the source does not issue DMA requests or require acknowledgement.

Destination peripheral 650, in one embodiment, is a value specifying the destination peripheral for each DMA transaction performed during active state 510. Similarly, destination peripheral 650 may be used to route an acknowledgement 242 to correct destination peripheral 130-180 via AND gates 420. Alternatively, a predefined value of destination peripheral 650 may indicate that the destination is always ready to read and/or write data, e.g. a RAM—thus the destination does not issue DMA requests or require acknowledgement.

Next state 660, in one embodiment, is a value specifying the next state 520 (or may specify a value of none if no state 520 exists for the current state 510). In some embodiments, this value 660 may be used to identify the next set of state information 418 to be loaded from memory 160, for example, when the state machine transitions to next state 520.

Completion state 670, in one embodiment, is a value specifying the completion state 540 (or may specify a value of none if no state 540 exists for active state 510). In some embodiments, this value 660 may be used to identify the next set of state information 418 to be loaded from memory 160, for example, when the state machine transitions to completion state 540.

State count value 660, in one embodiment, specifies the initial value to be stored in state counter 412A upon entering active state 510. Accordingly, this value 660 may correspond to the number of master DMA requests 240 that is to be issued in active state 510.

Figure 7:
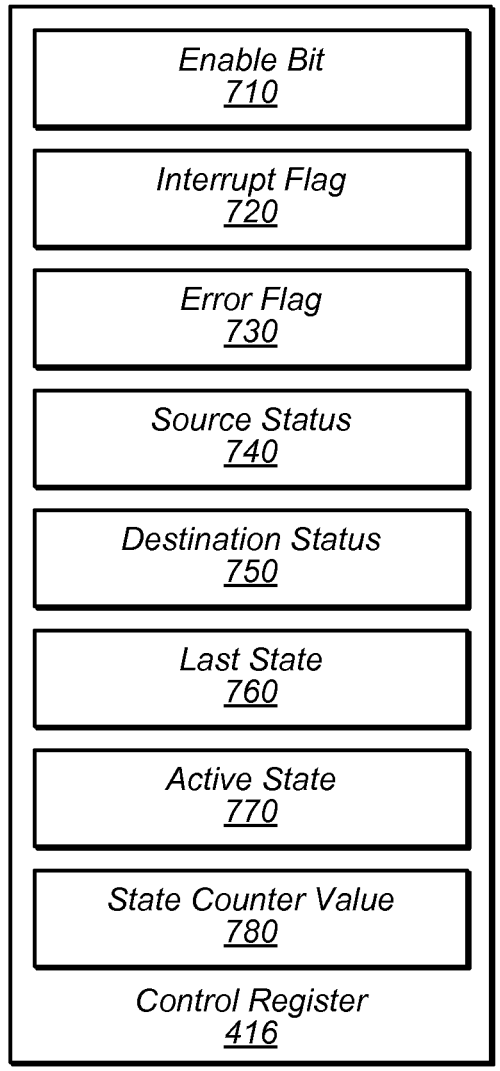
FIG. 7 is a block diagram illustrating one embodiment of a control register of the data transfer manager.

Turning now to FIG. 7, a block diagram of DTM control register 416 is depicted. As discussed above, in various embodiments, control register 416 stores general status and configuration information for DTM 192. In one embodiment, CPU 110 may set various configuration information via a write operation and may access various status information via a read operation.

Enable bit 710, in one embodiment, is a bit that is set to enable DTM 192 (or cleared to disable DTM 192) such as described above. For example, in some embodiments, settings bit 710 to a logical one may cause DTM engine 410 to begin operation.

Interrupt flag 720, in one embodiment, is set by DTM 192 to raise an interrupt to CPU 110. In some embodiments, flag 720 is set according to settings 610 and 620 discussed above.

Error flag 730, in one embodiment, is set by DTM 192 in response to transitioning an error state 530. For example, in one embodiment, flag 730 may be set if a requested DMA operation terminates prematurely—i.e. when an active state 510 was expected to generate more DMA requests 240. In one embodiment, error flag 730 may assert an interrupt in conjunction with flag 720.

Source status 740, in one embodiment, indicates whether the source peripheral 130-180 specified by value 640 has asserted a DMA request 330. In some embodiments, this value may be read by CPU 110 to identify why a particular error has occurred.

Destination status 750, in one embodiment, indicates whether the destination peripheral 130-180 specified by value 650 has asserted a DMA request 330. In some embodiments, this value may also be read by CPU 110 to identify why a particular error has occurred.

Last state 760, in one embodiment, indicates the last (i.e. previous) active state 510. This is another value that may be read by CPU 110 to determine which state caused a transition to an error state 530—e.g., in the case of timeout event.

Active state 770, in one embodiment, indicates the current active state 510. In one embodiment, CPU 110 can also write to active state 770 to set the initial state 510 for state machine 500—e.g., to take effect upon enabling DTM 192.

State counter value 780, in one embodiment, indicates the current value of counter 412A. This value may also be read to determine, in part, the status of the state machine.

Figure 8:
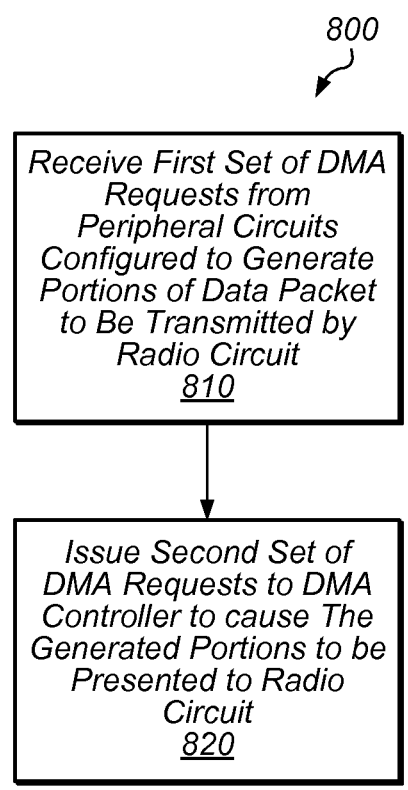
FIG. 8 is a flow diagram illustrating one embodiment of a method performed by the data transfer manager.

Turning now to FIG. 8, a flow diagram of a method 800 is depicted. Method 800 is one embodiment of a method performed by a circuit coordinating DMA operations such as DTM 192. In some embodiments, method 800 may be performed responsive to DTM 192 being enabled by CPU 110. While method 800 may be performed within the context of data packet assembly in one embodiment, similar methods are also contemplated for the disassembly of data packets (as well as methods for operating on data objects unrelated to data packets).

In 810, a data transfer management circuit (e.g., DTM 192) receives a first set of DMA requests (e.g., requests 330) from a plurality of peripheral circuits (e.g., ones of circuits 130-180) configured to generate portions of a data packet to be transmitted by a radio circuit (e.g., radio 120). In some embodiments, a processor (e.g., CPU 110) supplies a payload of the data packet.

In 820, the data transfer management circuit issues a second set of DMA requests (e.g., master requests 240) to a DMA controller (e.g., controller 190) to cause the generated portions to be presented to the radio circuit. In some embodiments, the issuing of a given DMA request to the DMA controller is in response to receiving DMA requests from two of the plurality of peripheral circuits (e.g., AES 140 and CRC 150). In some instances, the given request may initiate a peripheral-to-peripheral exchange. In some embodiments, the second set of DMA requests includes requests issued to different DMA channels of the DMA controller. In various embodiments, the second set of DMA requests are issued according to a state machine that transitions from one state to another state based on a value of a counter (e.g., based solely on counters 412A and/or 412B, or based, at least in part, on counters 412—i.e., based on counters 412 as well as one or more additional factors) that is adjusted in response to issuing a DMA request of the second set of DMA requests. In one embodiment, a processor (e.g., CPU 110) coupled to the data transfer management circuit enters a reduced-power mode while ones of the first or second set of DMA requests are being issued.

In some embodiments, method 800 further includes the data transfer management circuit routing an acknowledgment signal (e.g., an Ack 242) received from the DMA controller responsive to a given DMA request (e.g., a request 240) to ones of the peripheral circuits (e.g., as Acks 332). The peripheral circuits then coordinates a transmission of data between the peripheral circuits based on the routed acknowledge signal. Alternatively, the peripheral circuits may coordinate termination of DMA activity in response to the routed acknowledge signal (e.g., the DMA transition is complete).

Figure 9:
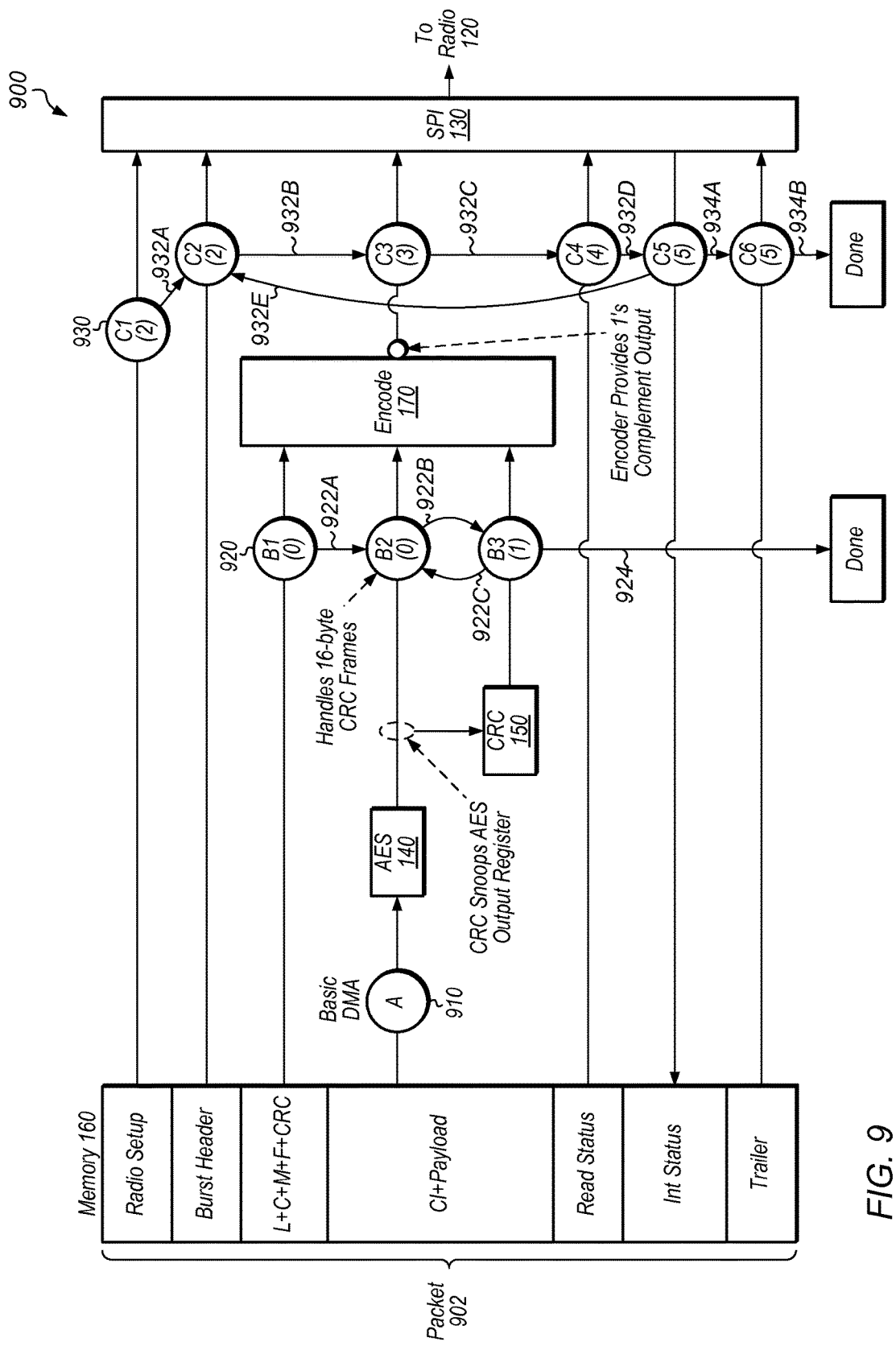
FIG. 9 is a diagram illustrating an exemplary assembling of a data packet for transmission by the system.

Turning now to FIG. 9, a diagram of an exemplary packet assembly 900 is depicted. As shown, memory 160 may include various blocks to be transmitted among ones of circuits 130-170 to assemble a data packet 902 for transmission by radio 120. In one embodiment, some of these portions may be initially generated by firmware/software executing on CPU 110. To coordinate assembly of packet 902, various portions are transmitted according to state machines 910-930 (in one embodiment, state machine 910 may instead be implemented as a basic DMA transaction rather than being initiated by a state machine).

In one embodiment, packet assembly 900 begins with a DMA transmission of packet 902's payload to AES 140 for encryption as specified by state machine 910 (in some embodiments, state machines 910-930 are implemented by separate respective DTMs 192 configured to operate in parallel with one another—thus, state A may not be associated with the initial set of DMA transactions for assembly 900). State machine 920 then initiates, at state B1, a set of DMA transactions to move another portion of packet 902 to encode 170 via DMA channel 0 (represented in FIG. 9 as "(0)" in state B1). DTM 192 may repeat this process until the entire block has been successfully moved. Upon performing transition 922A to state B2, state machine 920 moves a portion of the encrypted data from AES 140 to encoder 170 via DMA channel 0. That is, DTM 192 may wait until AES 140 and encode 170 assert requests 330 and then assert a corresponding master request 240 to move a portion of the data; State machine 920 then performs a transition 922B to state B3 and moves a checksum for the encrypted data from CRC 150 to encode 170. (In some embodiments, no DMA transmission is used to move data from AES 140 to CRC 150 as CRC 150 may be configured to snoop data from bus 112; for example, in one embodiment, CRC 150 is implemented in a similar manner as the coder circuit described in U.S. application Ser. No. 13/485,711 entitled "Coder with Snoop Mode.") State machine 920 may return to state B2 via transition 922C and repeat moving portions of encrypted payload and checksums to encode 170. For example, in the case of assembling an M-Bus packet, a checksum may be inserted after every 16 bytes of payload. Once this process is completed, state machine 920 may proceed to a completion state via transition 924 (in the illustrated embodiment, transitions 922 (as well as transitions 932) correspond to transitions 514 in FIG. 5; transition 924 (as well as transitions 934) correspond to transition 518).

Meanwhile, state machine 930 may begin moving radio setup and burst header portions to SPI 130 via DMA channel 2 in states C1 and C2, respectively. Once encode 170 has completed encoding a portion of data, state machine 930 may move the data to SPI 130 via DMA channel 3 at state C3. A read status portion may then be moved from memory 160 to SPI 130 at state C4. A corresponding initialization status block may then be read from SPI 130 to memory 160 at state C5. This process may repeat one or more times as shown by transition 932E. At state C6, a final trailer portion may then be transmitted to SPI 130. State machine 930 may then conclude by performing transition 934B to a completion state.

Figure 10:
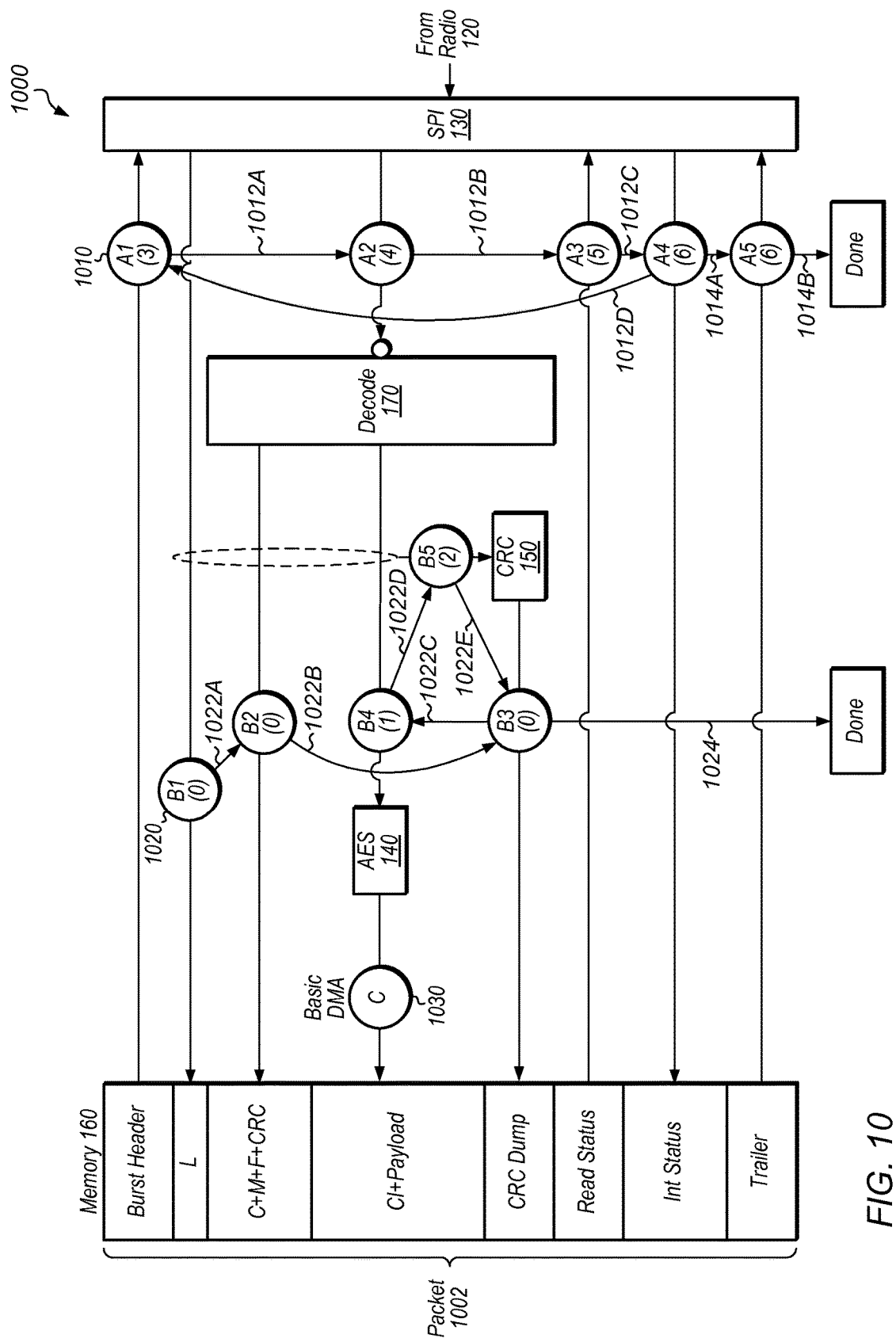
FIG. 10 is a diagram illustrating an exemplary disassembling of a data packet received by the system.

Turning now to FIG. 10, a diagram of an exemplary packet disassembly 1000 is depicted. As shown, various blocks may be transmitted among ones of circuits 130-170 to facilitate the disassembly of a packet 1002 received by radio 120. In the illustrated embodiment, state machines 1010-1030 coordinate the disassembly of packet 1002 by initiating DMA transactions to move various ones of the blocks (like state machine 910, state machine 1030, in one embodiment, may instead be implemented as a basic DMA transaction).

In one embodiment, disassembly 1000 begins with state machine 1010 moving a burst header from memory 160 to SPI 130 at state A1 (e.g. in order to initialize the radio receiver). At state A2, portions of packet 1002 are then transferred from SPI 130 to decode 170. At states A3 and A4, a read status is sent to SPI 130 and a corresponding initialization status is read from SPI 130. States A1-A4 may be repeated one or more times. Finally, at state A5, a trailer is transmitted to SPI 130 (e.g. to terminate the radio's receive process). As with assembly 900, transitions 1012 (as well as transitions 1022) may correspond to transitions 514; transitions 1014 (and transition 1024) may correspond to a transition 518.

Meanwhile, state machine 1020 may begin with moving a block from SPI 130 to memory 160 at state B1. At state B2, a portion of packet 1002 may be moved out of decode 170 to memory 160. At states B3-B5, various portions of packet 1002 are transmitted among circuits 140-170. As AES 140 decrypts portions of packet 1002, state machine 1030 moves portions of decrypted data to memory 160. States B3-B5 may be repeated one or more times until state machine 1020 completes. In one embodiment, CPU 110 may be invoked to operate on the disassembled portions of packet 1002 upon completion of disassembly 1000.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a direct memory access (DMA) controller coupled to a bus;
 a data transfer management (DTM) circuit;
 a processor configured to execute program instructions to configure the DTM circuit to provide DMA requests to the DMA controller, wherein the DMA requests cause the DMA controller to perform:
  retrieving a data object; and
  transmitting the data object to a peripheral circuit via the bus.

2. The apparatus of claim 1, wherein the data object is a data packet, and wherein the DTM circuit is configured to provide requests to the DMA controller in a manner that causes an assembly of the data packet.

3. The apparatus of claim 2, wherein the peripheral circuit is coupled to a radio circuit configured to transmit the data packet via an antenna.

4. The apparatus of claim 1, wherein the DTM circuit is configured to receive DMA requests from a plurality of peripheral circuits coupled to the bus, wherein the plurality of peripheral circuits are configured to generate portions of the data object, and wherein the DTM circuit is configured to provide the requests to the DMA controller based on the received DMA requests.

5. The apparatus of claim 4, wherein the DTM circuit is configured to provide a request to the DMA controller in response to receiving DMA requests from two of the plurality of peripheral circuits, wherein the DTM circuit is configured to receive, from the DMA controller, an acknowledgement corresponding to the request, and wherein the DTM circuit is configured to provide the acknowledgement to the two peripheral circuits.

6. The apparatus of claim 1, wherein the DTM circuit is configured to implement a state machine, and wherein the DTM circuit is configured to generate the requests provided to the DMA controller according to the state machine.

7. The apparatus of claim 1, wherein the DTM circuit is configured to receive configuration information generated by the processor, and wherein the processor is configured to enter a reduced power mode while the DTM circuit provides the requests to the DMA controller.

8. An apparatus, comprising:
a data transfer management (DTM) circuit configurable by a processor to coordinate assembly of a data packet, wherein the DTM circuit is configured to coordinate assembly by generating direct memory access (DMA) requests for a DMA controller, wherein the DMA requests cause a plurality of peripheral circuits coupled to a bus to transfer portions of the data packet over the bus.

9. The apparatus of claim 8, wherein the DTM circuit is configured to initiate, via the DMA controller, a peripheral-to-peripheral exchange that transfers data from a first of the plurality of peripheral circuits to a second of the plurality of peripheral circuits.

10. The apparatus of claim 8, wherein the DTM circuit is configured to generate DMA requests directed to a plurality of DMA channels of the DMA controller.

11. The apparatus of claim 8, wherein a first of the plurality of peripheral circuits is configured to encrypt at least a portion of the data packet, and wherein a second of the plurality of peripheral circuits is configured to generate a checksum value.

12. The apparatus of claim 8, wherein the DTM circuit is further configured to coordinate disassembly of a received data packet, by generating DMA requests for the DMA controller, and wherein the apparatus is configured to receive the data packet via a radio circuit.

13. The apparatus of claim 8, wherein the DTM circuit is configured to generate DMA requests according to a state machine implemented by the DTM circuit, wherein the state machine is configured to identify a source and a destination for one or more DMA transfers via the bus.

14. The apparatus of claim 13, wherein the DTM circuit is coupled to the bus, and wherein the DTM circuit is configured to operate as a bus master of the bus to retrieve state information of the state machine from memory.

15. A method, comprising:
a data transfer management (DTM) circuit receiving configuration information from a processor, wherein the configuration information is usable to assemble a data packet;
the DTM circuit receiving a first set of DMA requests from a plurality of peripheral circuits configured to generate portions of the data packet; and
the DTM circuit issuing a second set of DMA requests to a DMA controller, wherein the DMA controller causes the generated portions to be presented to a circuit, and wherein the second set of DMA requests are issued based on the first set of DMA requests and the configuration information.

16. The method of claim 15, wherein the second set of DMA requests are issued according to a state machine that transitions from one state to another state based on a value of a counter, and wherein the method further comprises:
the DTM circuit adjusting the value of the counter in response to issuing a DMA request of the second set of DMA requests.

17. The method of claim 15, wherein the issuing includes issuing a given DMA request to the DMA controller in response to receiving DMA requests from two of the plurality of peripheral circuits, and wherein the method further comprises:
the DTM circuit routing, to the two peripheral circuits, an acknowledgment signal received from the DMA controller responsive to the given DMA request, wherein the two peripheral circuits are configured to coordinate a transmission of data between the two peripheral circuits based on the routed acknowledgement signal.

18. The method of claim 15, wherein the second set of DMA requests includes requests issued to different DMA channels of the DMA controller, and wherein the DMA controller causes the generated portions to be presented to a radio circuit.

19. The method of claim 15, further comprising:
the DTM circuit receiving a third set of DMA requests from ones of the plurality of peripheral circuits configured to operate on portions of a received data packet; and
the DTM circuit issuing a fourth set of DMA requests to the DMA controller, wherein the DMA controller causes the portions to be presented to ones of the plurality of peripheral circuits to facilitate disassembly of the received data packet, and wherein the fourth set of DMA requests are issued based on the third set of DMA requests.

20. The method of claim 19, wherein the fourth set of DMA requests are issued according to a state machine that coordinates disassembly of the received data packet and transitions from one state to another state based on a value of a counter, and wherein the method further comprises:
the DTM circuit adjusting the value of the counter in response to issuing a DMA request of the fourth set of DMA requests.

* * * * *